United States Patent
Ramachandra Iyer et al.

(10) Patent No.: US 11,537,938 B2
(45) Date of Patent: Dec. 27, 2022

(54) METHOD AND A SYSTEM FOR CONTEXT BASED CLUSTERING OF OBJECT

(71) Applicant: Wipro Limited, Bangalore (IN)

(72) Inventors: Manjunath Ramachandra Iyer, Bangalore (IN); Rameshwar Pratap, Bangalore (IN); Boby Chaitanya Villari, Bengaluru (IN)

(73) Assignee: Wipro Limited, Bangalore (IN)

( * ) Notice: Subject to any disclaimer, the term of this patent is extended or adjusted under 35 U.S.C. 154(b) by 942 days.

(21) Appl. No.: 16/370,900

(22) Filed: Mar. 30, 2019

(65) Prior Publication Data

US 2020/0265335 A1    Aug. 20, 2020

(30) Foreign Application Priority Data

Feb. 15, 2019   (IN) .............................. 201941006135

(51) Int. Cl.
  *G06N 20/00* (2019.01)
  *G06K 9/62* (2022.01)
  *G06V 10/70* (2022.01)

(52) U.S. Cl.
  CPC ............ *G06N 20/00* (2019.01); *G06K 9/622* (2013.01); *G06V 10/768* (2022.01); *G06K 9/6256* (2013.01)

(58) Field of Classification Search
  CPC ...... G06N 20/00; G06K 9/622; G06K 9/6256; G06K 9/6221; G06K 9/6262; G06V 10/768; G06V 40/10; G06F 16/355
  USPC ........................................................ 707/12
  See application file for complete search history.

(56) References Cited

U.S. PATENT DOCUMENTS

| | | | | |
|---|---|---|---|---|
| 2002/0019826 A1* | 2/2002 | Tan | ........................ | G06F 16/355 707/999.102 |
| 2009/0048823 A1* | 2/2009 | Liu | ........................ | G06F 40/279 704/9 |
| 2009/0274377 A1* | 11/2009 | Kweon | ................... | G06N 20/00 382/225 |

(Continued)

OTHER PUBLICATIONS

Wei, C-P., et al., "A Personalized Document Clustering Approach to Addressing Individual Categorization Preferences" Proceedings of the Third Workshop on Knowledge Economy and Electronic Commerce, May 15, 2014, pp. 118-128.

*Primary Examiner* — Belix M Ortiz Ditren
*Assistant Examiner* — Abdullah A Daud
(74) *Attorney, Agent, or Firm* — Finnegan, Henderson, Farabow, Garrett & Dunner, LLP

(57) ABSTRACT

A method and a system are described for context based clustering of one or more objects. The method comprises receiving, by the object clustering system, receiving, by an object clustering system, an object clustering request for one or more objects associated with a plurality of contextual parameters, where the plurality of contextual parameters comprises one or more physical attributes and one or more non-physical attributes. It further includes tagging the one or more non-physical attributes respectively to the one or more physical attributes. It further includes identifying a common context from the one or more physical attributes associated with the one or more objects based on the tagging. It further includes mapping the one or more physical attributes to the one or more objects based on the common context. It then includes clustering the one or more objects based on the mapping.

11 Claims, 4 Drawing Sheets

(56) References Cited

U.S. PATENT DOCUMENTS

| | | | | |
|---|---|---|---|---|
| 2010/0030552 | A1* | 2/2010 | Chen | G06F 16/367 |
| | | | | 704/9 |
| 2011/0026831 | A1* | 2/2011 | Perronnin | G06F 16/50 |
| | | | | 707/E17.055 |
| 2013/0021496 | A1* | 1/2013 | Ranbro | G06T 7/90 |
| | | | | 348/E9.051 |
| 2017/0004821 | A1* | 1/2017 | Hirano | G10L 13/0335 |
| 2018/0181883 | A1* | 6/2018 | Ikeda | H04L 63/1425 |
| 2018/0293668 | A1* | 10/2018 | Grey | G06F 8/71 |
| 2019/0018901 | A1* | 1/2019 | Lin | G06Q 30/0201 |
| 2019/0130776 | A1* | 5/2019 | Chakraborty | G09B 5/125 |
| 2019/0354744 | A1* | 11/2019 | Chaloux | G06F 16/3334 |
| 2019/0371145 | A1* | 12/2019 | McQueen | G08B 13/19656 |
| 2020/0133269 | A1* | 4/2020 | Wang | G06N 3/0454 |
| 2020/0177646 | A1* | 6/2020 | Deole | H04L 65/1083 |
| 2020/0185102 | A1* | 6/2020 | Leventhal | G06N 20/00 |

\* cited by examiner

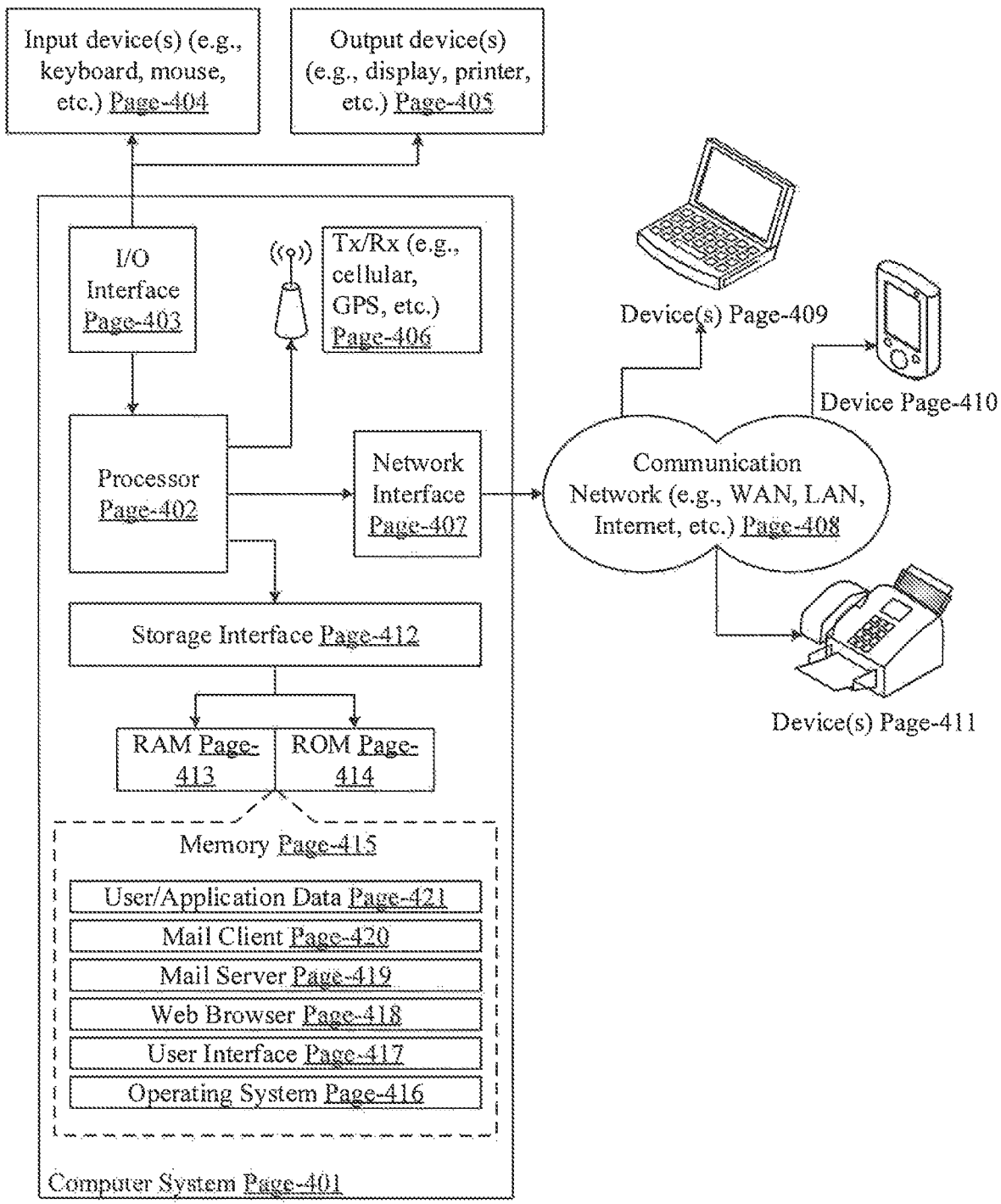
FIG. 4 Example Computer System

METHOD AND A SYSTEM FOR CONTEXT BASED CLUSTERING OF OBJECT

TECHNICAL FIELD

The present subject matter is related, in general, to data processing and information retrieval and more specifically, but not exclusively, to a method and a system for context based clustering of object.

BACKGROUND

Clustering of objects from a document or image is challenging as it involves finding similar characteristics among the objects from the documents. Existing technologies only suggest clustering based on keywords and similarity patterns. Furthermore, there may be situations where the dynamics and attributes of objects may change even after the clustering, owing to false positives. The existing technologies only disclose document clustering of common types, regardless of content in the documents. And clustering of the objects is normally restricted to finding tangible content from the documents.

The information disclosed in this background of the disclosure section is only for enhancement of understanding of the general background of the invention and should not be taken as an acknowledgement or any form of suggestion that this information forms the prior art already known to a person skilled in the art.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method of context based clustering of objects. The method includes receiving, by an object clustering system, an object clustering request for one or more objects associated with a plurality of contextual parameters, where the plurality of contextual parameters involves one or more physical attributes and one or more non-physical attributes. The method further includes tagging the one or more non-physical attributes respectively to the one or more physical attributes. The method further includes identifying a common context from the one or more physical attributes associated with the one or more objects based on the tagging. The method further includes mapping the one or more physical attributes to the one or more objects based on the common context. The method further includes clustering the one or more objects based on the mapping.

According to embodiments illustrated herein, there may be provided an object clustering system for context based clustering of objects. The system includes a processor and a memory communicatively coupled to the processor. The memory stores processor executable instructions, which on execution causes the processor to receive an object clustering request for one or more objects associated with a plurality of contextual parameters where the plurality of contextual parameters comprises one or more physical attributes and one or more non-physical attributes. The object clustering system may be further configured to tag the one or more non-physical attributes respectively to the one or more physical attributes. The object clustering system may be further configured to identify a common context from the one or more physical attributes associated with the one or more objects based on the tagging. The object clustering system may be further configured to map the one or more physical attributes to the one or more objects based on the common context. And, the object clustering system may be further configured to cluster the one or more objects based on the mapping.

The present disclosure relates to a non-transitory computer readable medium including instructions stored thereon that when processed by at least one processor may direct an object clustering system to initiate clustering of objects based on a common context. The instructions may direct the object clustering system to receive an object clustering request for one or more objects associated with a plurality of contextual parameters where the plurality of contextual parameters comprises one or more physical attributes and one or more non-physical attributes. The instructions may then direct to tag the one or more non-physical attributes respectively to the one or more physical attributes. The instructions may then direct to identify a common context from the one or more physical attributes associated with the one or more objects based on the tagging. The instructions may then direct to map the one or more physical attributes to the one or more objects based on the common context. The instructions may then direct to cluster the one or more objects based on the mapping.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 4 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
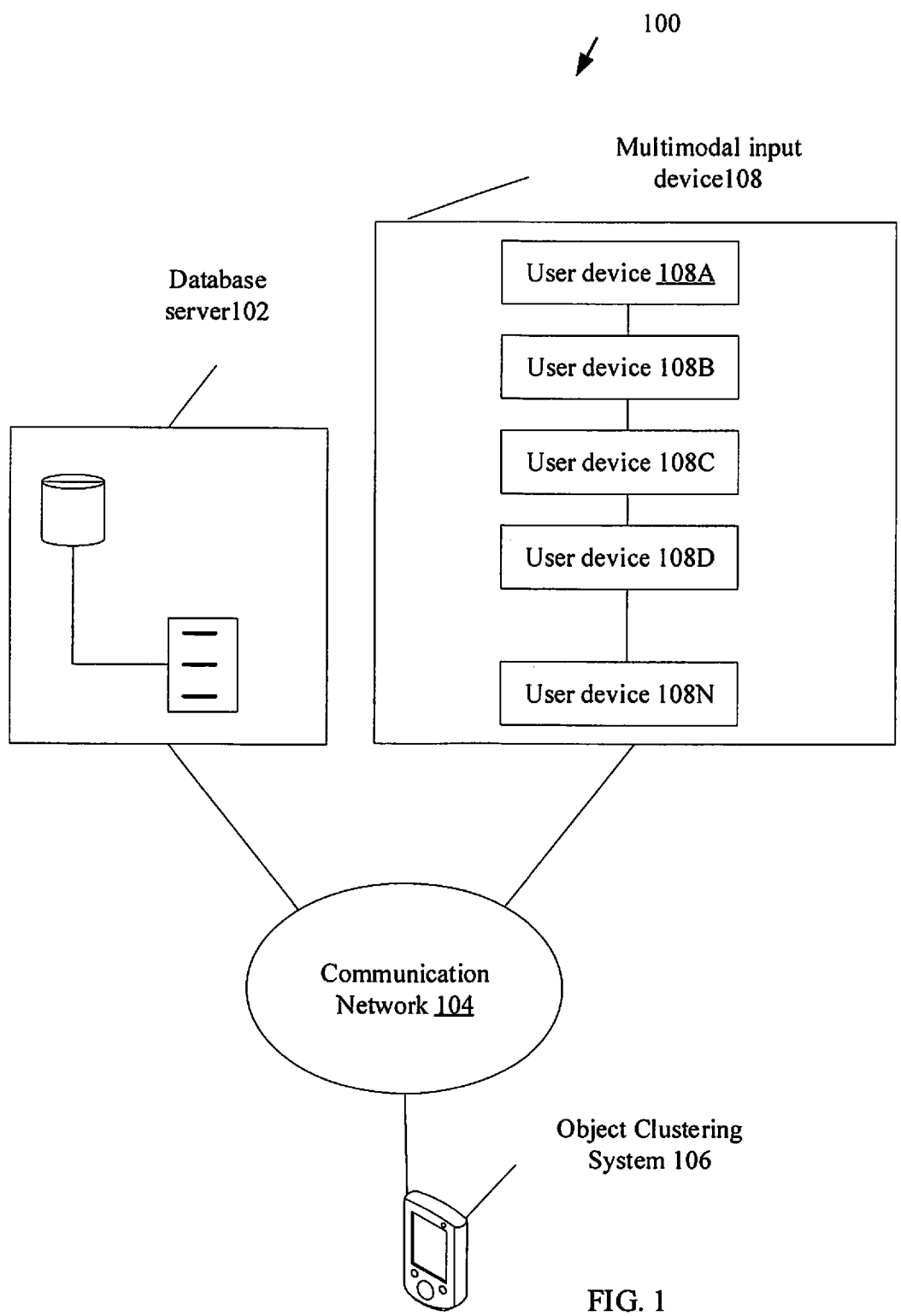
FIG. 1 illustrates a block diagram of an exemplary environment in which various embodiments of the present disclosure may function.

FIG. 1 is a block diagram that illustrates an exemplary environment 100 in which various embodiments of the present disclosure may function. The environment 100 may include a database server 102. In some embodiments, the database server 102 may store one or more trained data sets which may be used for training an object clustering system 106. The database server 102 may store data on one or more objects in multi-modal formats of documents, images, videos and audios. This stored data in multi-modal formats may not be construed exhaustive set of keywords for identifying the one or more objects. But the stored data in multi-modal formats may be mutually exclusive data sets, used for training the object clustering system 106 to identify the one or more objects. The database server 102 may be communicatively coupled to the object clustering system 106 and a multimodal input device 108 (108A . . . 108N) through a communication network 104.

The communication network 104 although represented as one communication network in FIG. 1 may in reality correspond to different communication networks under different contexts. For example, the communication network 104 may include various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment the object clustering system 106 may be configured to cluster the one or more objects based on a common context. In an embodiment the common context may be a commonality identified among the one or more objects. It may be configured to cluster the one or more objects from texts, images, image frames from videos and audio signatures from audios. In an embodiment the object may encompass a few lines of text or one or more words from the text sharing the common context (the commonality as described before), encompass one or more figures from images sharing the common context, encompass one or more audio signatures sharing the common context from the audios. The object clustering system may receive clustering request for one or more objects from the multimodal input device 108.

The multimodal input device 108 is a human machine interface (hereafter HMI interface) to receive data as multimodal inputs, in one or more formats such as at least documents, images, videos and audios. The one or more multimodal inputs may have physical and non-physical attributes associated with it. In an embodiment the HMI interface may be at least a handheld device, for example a mobile phone, a tablet, a desktop computer, a laptop, a camera and a video or an audio recording device. The one or more multimodal inputs may be transferred to the object clustering system 106 via the communication network 104.

Figure 2:
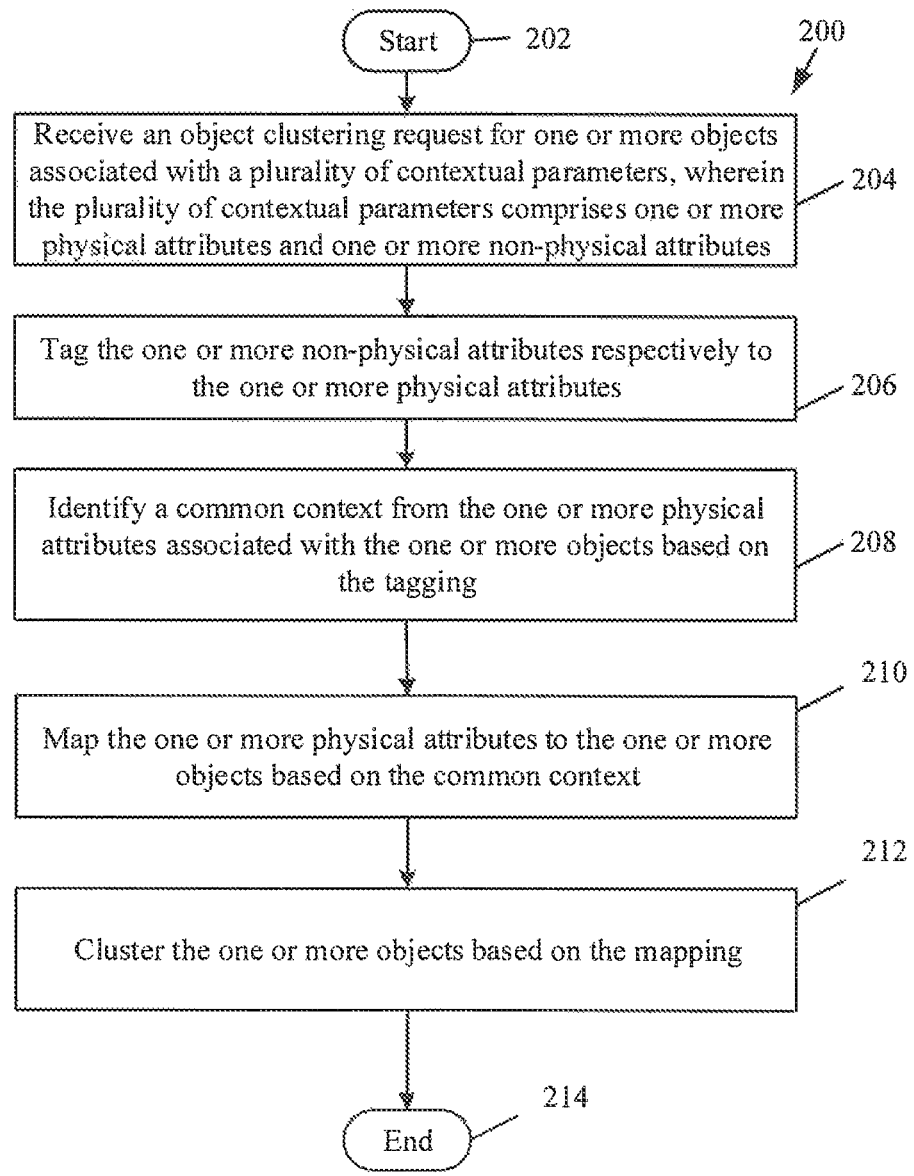
FIG. 2 is a flowchart illustrating a method of context based object clustering, in accordance with some embodiments of the present disclosure.

FIG. 2 is a is a flowchart illustrating a method 200 describing a context based clustering of objects. The method starts at step 202. At step 204, the multimodal input interface 310 receives via transceiver 306 (explained in FIG. 3), an object clustering request for one or more objects associated with a plurality of contextual parameters. The plurality of contextual parameters includes one or more physical attributes and one or more non-physical attributes. In an embodiment, the plurality of contextual parameters are the user preferences, based on which the one or more objects are to be associated with and then clustered. For example, the user may request clustering of all the clothes purchased in Calcutta and where the clothes are red in color, the clothes are to be shirts. In the example, the plurality of contextual parameters are red as color, shirt as one of the types of the clothes and Calcutta as the location. The user may input the clustering request through the HMI interface. The one or more physical attributes includes at least one of colors, shapes, names, places, sensor data, and time duration associated with the one or more objects. The one or more non-physical attributes includes at least one of user emotions, user gestures, pronouns, tastes, and smells and locations. In an embodiment, the multimodal input interface 310 may be configured to process segregation of the one or more physical attributes from the one or more non-physical attributes right after receiving the inputs in one or more modalities.

Once the multimodal input interface 310 receives the request for clustering along with the plurality of parameters mentioned, the meta-tagger 312 at step 206, associates the plurality of contextual parameters with the one or more objects requested to be clustered. The meta-tagger tags the one or more non-physical attributes respectively to the one or more physical attributes. Tagging the one or more non-physical attributes further includes identifying a correlation between the one or more non-physical attributes and the one or more physical attributes. For example, from a text document the user would like to cluster comments by a person regarding a product review. For example, Swarnil a product reviewer has reviewed a mobile handset.

"I am Swarnil, a user of Mango U phone. I recently purchased this product on the $10^{th}$ of Feb. 2019. The Mango U phone is black in color, with gorilla glass cover, and has 3 GB RAM memory. I have been using this product for over a month and have faced no problems at all. The camera is just alright but is not worth the price of the phone. I did not like the high price. The Mango U phone could have come with wired earphones, the absence of it is a big turnoff. However, I liked the phone as a whole."

The reviews are in a document along with commentaries of other reviewers. In the aforementioned example, Swarnil is a person, the reviewer, Mango U phone is the product he has reviewed. The physical attributes are Swarnil as the person's name, Mango U phone as the phone name, black as the color of the phone, 10 Feb. 2019 as the date of purchase and the gorilla glass cover, camera 3 GB RAM memory as the phone's features. The one or more non-physical attributes are "I" as the pronoun associated with the noun Swarnil, the emotions like "camera is just alright", "not worth the price of the phone", "I did not like the high price", "the absence of it is a big turnoff" and "I liked the phone as a whole". The meta-tagger 312 in the exemplary embodiment associates the one or more physical attributes and the one or more non-physical attributes to reviewer Swarnil. It then tags the one or more non-physical attributes respectively to the one or more physical attributes. For example, the pronoun "I", emotions as aforementioned are tagged to Swarnil, "camera is just alright", "not worth the price of the phone" and "I did not like the high price" is tagged to the phone. After the meta-tagger 312 metatags the plurality of contextual parameters to the one or more objects, the attribute generator 314 identifies a common context from the one or more physical attributes associated with the one or more objects based on the tagging.

The attribute generator 314 at step 208, identifies the common context from the one or more physical attributes associated with the one or more objects based on the tagging. In the aforementioned example, the document may contain reviews from other reviewers and has reviews on various phones other than the Mango U phone. The request may be to cluster reviews by users on the Mango U phone and specifically positive reviews. Thus, the attribute generator 314 in this case will identify the positive reviews as the common context across the document and identify positive reviews as the common context from the one or more physical attributes. Once the common context is identified, the attribute mapper 316 at step 210, maps the one or more physical attributes to the one or more objects. In the aforementioned example, the attribute mapper 316 may map the negative reviews of all the reviewers to the phone Mango U phone, where the negative review is the common context. And for example, the date of purchase, which is also an attribute, will not be considered while identifying the common context.

Once the one or more physical attributes are mapped to the one or more objects, the clustering unit 318 clusters the one or more objects based on the mapping. Clustering the one or more objects includes determining a mean value of the one or more physical attributes by generating a histogram, and a weightage is assigned to the one or more physical attributes. Once the mean value is determined, the clustering unit 318 computes a variance value of the one or more physical attributes from the mean value of the histogram, where the one or more objects are clustered when a distance of the variance value is lesser than a threshold distance with respect to the mean value. The clustering unit 318 may further create another cluster for the one or more objects if the distance between the variance value with respect to the mean value is more than the pre-defined distance. In an embodiment, the one or more physical parameters are given the value of optimization constraints. For example, if it is required to cluster all the people who are sad, and initially degree of sadness is to be measured. Then, the mean and variance in sadness are computed. To include a sample to sad or not, the error in sadness from the mean of the cluster is selected and mean keeps shifting as more members are added to the cluster. The minimum distance from the mean is taken for optimization constraint. An optimization constraint is that all the elements within a certain minimum distance from the local mean are to be included into the cluster. The one or more objects may be included in the cluster if the variance distance is less than the threshold. In another embodiment, the clustering unit 318 takes a decision if the weightage of the one or more physical attributes is below the mean, then a new cluster may be generated. The method 200 ends at step 214.

Figure 3:
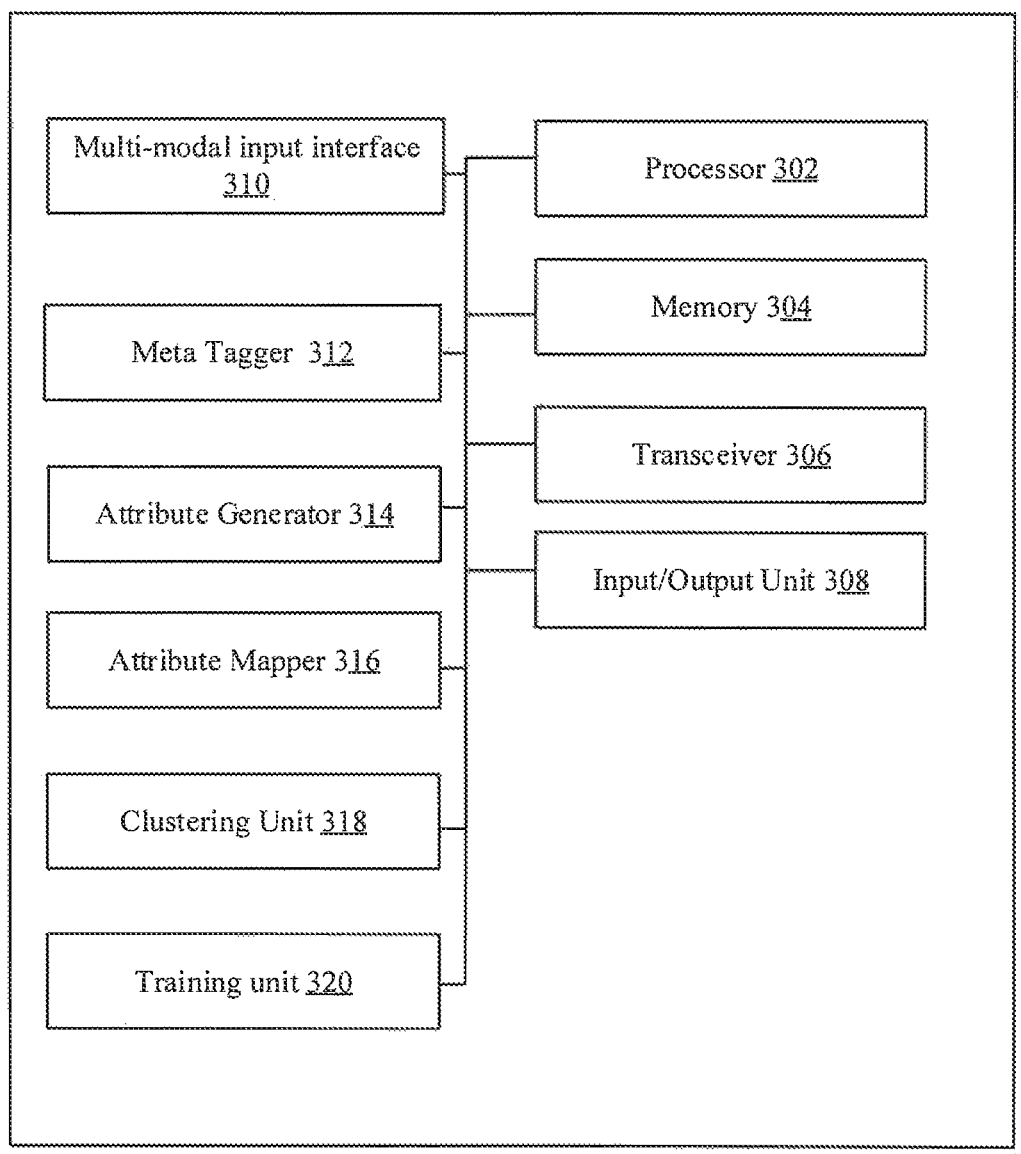
FIG. 3 illustrates a block diagram of an object clustering system, in accordance with some embodiments of the present disclosure.

FIG. 3 illustrates a block diagram, in accordance with some embodiments of the present disclosure, an object clustering system 106, configured for context based clustering of objects. The object clustering system 106 may include a processor 302, a memory 304, a transceiver 306, and an input/output unit 308. The object clustering system 106 may further include a multi-modal input interface 310, a meta-tagger 312, an attribute generator 314, an attribute mapper 316, a clustering unit 318 and a training unit 320.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. It will be appreciated that such modules may be represented as a single module or a combination of different modules. Furthermore, a person of ordinary skill in the art will appreciate that in an implementation, the one or more modules may be stored in the memory 305, without limiting the scope of the disclosure. The modules when configured with the functionality defined in the present disclosure will result in a novel hardware.

The processor 302 may include suitable logic, circuitry, interfaces, and/or code that may be configured to execute a set of instructions stored in the memory 304. The processor 302 may be implemented based on a number of processor technologies known in the art. Examples of the processor 302 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 304 may include suitable logic, circuitry, interfaces, and/or code that may be configured to store the set of instructions, which may be executed by the processor 302 for recommending products to the user. For example, the memory may store information on weightages to models, intent-scores to be assigned to the one or more inputs of various levels for NLP, text and bodily expressions. In an embodiment, the memory 304 may be configured to store one or more programs, routines, or scripts that may be executed in coordination with the processor 302. The memory 304 may be implemented based on a Random Access Memory (RAM), a Read-Only Memory (ROM), a Hard Disk Drive (HDD), a storage server, and/or a Secure Digital (SD) card.

The transceiver 306 may receive one or more multi-modal user inputs in forms of clustering requests for the one or more objects. The transceiver 306 may implement one or more known technologies to support wired or wireless communication with the communication network 104. In an embodiment, the transceiver 306 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 306 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, for example Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The object clustering system 106 may further include an Input/Output (I/O) unit 308. The Input/Output (I/O) unit 308 may include suitable logic, circuitry, interfaces, and/or code that may be configured to receive an input or transmit an output. The input/output unit 308 may include various input and output devices that are configured to communicate with the processor 302. Examples of the input devices include, but are not limited to, a keyboard, a mouse, a joystick, a touch screen, a microphone, and/or a docking station. Examples of the output devices include, but are not limited to, a display screen and/or a speaker.

In an embodiment the multi-modal input interface 310 may be configured to receive an object clustering request for one or more objects associated with a plurality of contextual parameters, where the plurality of contextual parameters comprises one or more physical attributes and one or more non-physical attributes. The meta-tagger 312 may be then configured to tag the one or more non-physical attributes respectively to the one or more physical attributes. Once the meta-tagger 312 tags to the one or more physical attributes, the attribute generator 314 may identify a common context from the one or more physical attributes associated with the one or more objects based on the tagging. The attribute mapper 316 may then map the one or more physical attributes to the one or more objects based on the common context and the clustering unit 318 clusters the one or more objects based on the mapping.

The training unit 320 is a training engine configured to train the object clustering system 106 for learning to identify the one or more objects adaptively. The training may further include training the object clustering system 106 with multimodalities of inputs including at least one of documents, images, videos and audios. This may further include identifying texts from the documents, one or more figures from the images, one or more figures from image frames of the videos and one or more audio signatures from the audios. The object clustering system 106 may be then trained to identify the plurality of contextual parameters associated with the one or more objects, learn a pattern over a historical usage of the clustering of the one or more objects based on the common context. And once the one or more objects are clustered, the object clustering system 106 may then incorporate user feedback on the clustering of the one or more objects associated with the common context. In another embodiment, the object clustering system 106 may be configured to learn dynamically the physical attributes of the one or more objects which may change over time. And based on this learning, it may take a decision whether to include the one or more objects in the cluster.

Exemplary Embodiments

For example, "ABC" is an e-commerce company that packages and ships fruits to consumers through online orders. Based on the order, fruits are clustered by the object clustering system 106. Swarnil orders for *papaya* and Kiwi to be delivered after 3 days. The object clustering system 106, with this constraint, picks up a raw *papaya* (which is almost green and likely to get ripe in 3 days) instead of available yellow fruit for packing. For Kiwi, the yardstick is not color but weight and texture. Odor plays a role in yet another fruit. As aforementioned, the color of *papaya* is the physical attribute which changes over time and the object clustering system 106 is configured to learn this change and can take a decision to cluster such papayas.

In another exemplary embodiment, Swarnil is a researcher in oncology. He would like to know the biological parameters influencing different types of cancer. For example, he would like to see if there is a correlation between spread in liver cancer and sugar level, HDL (high density lipid), LDL (low density lipid), and the like. For that, he would request the object clustering system 106 to cluster the liver cancer patient records containing HDL, LDL, and the like. These parameters are scattered in different documents of Electronic health record (EHR) of a patient. A search for liver cancer EHR is made. Next, any correlation in parameters, for example LDL is checked interactively. Here, Swarnil uses dissimilar objects scattered across directories and documents for clustering and that being the image objects (of radiology images of liver), text objects indicating report, numbers indicating values of LDL/HDL, and the like. Swarnil may further request to group the liver cancer patient documents with HDL less than 40 (clinical borderline). The object clustering system 106 then clusters the information based on the input received. Swarnil almost finds all records out of this range. He then refines the clustering. He sets the range for LDL as 30-40 and finds 80% records fits in the range. Swarnil further narrows down the clustering with 30-35. Now he finds 90% of earlier records in this range. It helps to conclude spread of the cancer goes with very low value of LDL. The aforementioned embodiment this illustrates refining of clustering.

Computer System

FIG. 4 illustrates a block diagram of an exemplary computer system for implementing embodiments consistent with the present disclosure. Variations of computer system 401 may be used for clustering the one or more objects based on the common context. The computer system 401 may comprise a central processing unit ("CPU" or "processor") 402. Processor 402 may comprise at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon™, Duron or Opteron, ARM's application, embedded or secure processors, IBM PowerPC m, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone™, Smart TV, Android-based phones, etc.), tablet computers, eBook readers (Amazon Kindle, Nook, etc.), laptop computers, notebooks, gaming consoles (Microsoft Xbox™, Nintendo DS™, Sony PlayStation™, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution™ (BSD), FreeBSD, NetBSD, OpenBSD, etc.), Linux distributions (e.g., Red Hat™, Ubuntu™, Kubuntu™, etc.), IBM OS/2™, Microsoft Windows™ (XP, Vista/7/8, etc.), Apple iOS ", Google Android™, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero™, Metro™, etc.), Unix X-Windows, web interface libraries (e.g., ActiveX™, Java™, Javascript™, AJAX™, HTML, Adobe Flash", etc.), or the like.

In some embodiments, the computer system 401 may implement a web browser 418 stored program component. The web browser may be a hypertext viewing application, such as Microsoft™ Internet Explorer™, Google Chrome™, Mozilla Firefox™, Apple Safari™, etc. Secure web browsing may be provided using HTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange™, or the like. The mail server may utilize facilities such as ASP, ActiveX, ANSI C++/C #, Microsoft-.NET™, CGI scripts, Java™, JavaScript™, PERL™, PHP™, Python™, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail™, Microsoft Entourage™, Microsoft Outlook™, Mozilla Thunderbird™, etc.

In some embodiments, computer system 401 may store user/application data 421, such as the data, variables, records, etc. as described in this disclosure. Such databases may be implemented as fault-tolerant, relational, scalable, secure databases such as Oracle™ or Sybase™. Alternatively, such databases may be implemented using standardized data structures, such as an array, hash, linked list, struct, structured text file (e.g., XML), table, or as object-oriented databases. Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The present disclosure considers user preferences for clustering of objects from at least of documents, images, videos and audios. As a result, logically similar or associated objects with a common context can be grouped. Further it can detect implicit, abstract or non-physical expression of users for clustering. The object clustering system 106 also supports clustering of dissimilar objects, notional objects.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

We claim:

1. A method of context based clustering of objects, the method comprising:
   receiving, by an object clustering system, an object clustering request for one or more objects associated with a plurality of contextual parameters, wherein the plurality of contextual parameters comprises one or more physical attributes and one or more non-physical attributes;
   tagging, by the object clustering system, the one or more non-physical attributes respectively to the one or more physical attributes;
   identifying, by the object clustering system, a common context from the one or more physical attributes associated with the one or more objects based on the tagging;
   mapping, by the object clustering system, the one or more physical attributes to the one or more objects based on the common context;
   determining, by the object clustering system, a mean value of the one or more physical attributes by generating a histogram, and a weightage is assigned to the one or more physical attributes;
   computing, by the object clustering system, a variance value of the one or more physical attributes from the mean value of the histogram; and
   clustering, by the object clustering system, the one or more objects based on the mapping when a distance of the variance value is lesser than a pre-defined distance with respect to the mean value.

2. The method as claimed in claim 1, wherein the one or more physical attributes comprises at least one of colors, shapes, names, and places, and the one or more non-physical attributes comprises at least one of user emotions, user gestures, pronouns, tastes, and smells.

3. The method as claimed in claim 1, wherein tagging the one or more non-physical attributes further comprises: identifying a correlation between the one or more non-physical attributes and the one or more physical attributes.

4. The method as claimed in claim 1 further comprising: creating another cluster for the one or more objects if the distance between the variance value with respect to the mean value is more than the pre-defined distance.

5. The method as claimed in claim 1 further comprising: learning to identify the or more objects adaptively, wherein the learning comprises:
training the object clustering system with multimodalities of inputs comprising at least one of documents, images, videos and audios, wherein the training further comprises identifying texts from the documents, one or more figures from the images, one or more figures from image frames of the videos and one or more audio signatures from the audios;
identifying the plurality of contextual parameters associated with the one or more objects;
learning a pattern over a historical usage of the clustering of the one or more objects based on the common context; and
incorporating user feedback on the clustering of the one or more objects associated with the common context.

6. An object clustering system for context based clustering of objects comprising:
a processor; and
a memory communicatively coupled to the processor, wherein the memory stores processor executable instructions, which on execution causes the processor to:
receive an object clustering request for one or more objects associated with a plurality of contextual parameters, wherein the plurality of contextual parameters comprises one or more physical attributes and one or more non-physical attributes;
tag the one or more non-physical attributes respectively to the one or more physical attributes;
identify a common context from the one or more physical attributes associated with the one or more objects based on the tagging;
map the one or more physical attributes to the one or more objects based on the common context;
determine a mean value of the one or more physical attributes by generating a histogram, and a weightage is assigned to the one or more physical attributes;
compute a variance value of the one or more physical attributes from the mean value of the histogram; and
cluster the one or more objects based on the mapping when a distance of the variance value is lesser than a pre-defined distance with respect to the mean value.

7. The object clustering of claim 6, wherein the one or more physical attributes comprises at least one of colors, shapes, names, and places, and the one or more non-physical attributes comprises at least one of user emotions, user gestures, pronouns, tastes, smells and locations.

8. The object clustering of claim 6, wherein tagging the one or more non-physical attributes further comprises: identifying a correlation between the one or more non-physical attributes and the one or more physical attributes.

9. The object clustering of claim 6 further comprising: creating a new cluster for the one or more objects if the distance between the variance value with respect to the mean value is more than the pre-defined distance.

10. The object clustering of claim 6 further comprising: learning to identify the or more objects adaptively, wherein the learning comprises:
training the object clustering system with multimodalities of inputs comprising at least one of documents, images, videos and audios, wherein the training further comprises identifying texts from the documents, one or more figures from the images, one or more figures from image frames of the videos and one or more audio signatures from the audios;
identifying the plurality of contextual parameters associated with the one or more objects;
learning a pattern over a historical usage of the clustering of the one or more objects based on the common context; and
incorporating user feedback on the clustering of the one or more objects associated with the common context.

11. A non-transitory computer-readable storage medium having stored thereon, a set of computer-executable instructions causing a computer comprising one or more processors to perform steps comprising:
receive an object clustering request for one or more objects associated with a plurality of contextual parameters, wherein the plurality of contextual parameters comprises one or more physical attributes and one or more non-physical attributes;
tag the one or more non-physical attributes respectively to the one or more physical attributes;
identify a common context from the one or more physical attributes associated with the one or more objects based on the tagging;
map the one or more physical attributes to the one or more objects based on the common context; and
determine a mean value of the one or more physical attributes by generating a histogram, and a weightage is assigned to the one or more physical attributes;
compute a variance value of the one or more physical attributes from the mean value of the histogram; and
cluster the one or more objects based on the mapping when a distance of the variance value is lesser than a pre-defined distance with respect to the mean value.

* * * * *